United States Patent
Ochiai et al.

(10) Patent No.: US 9,409,257 B2
(45) Date of Patent: Aug. 9, 2016

(54) WIRE FOR I-SHAPE OIL RINGS AND PRODUCING METHOD OF THE SAME

(71) Applicant: HITACHI METALS, LTD., Tokyo (JP)

(72) Inventors: Masanori Ochiai, Kumagaya (JP); Makoto Sasaki, Kumagaya (JP); Tomoyuki Satoh, Yasugi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/942,070

(22) Filed: Nov. 16, 2015

(65) Prior Publication Data

US 2016/0067831 A1    Mar. 10, 2016

Related U.S. Application Data

(62) Division of application No. 12/663,952, filed as application No. PCT/JP2008/060649 on Jun. 11, 2008, now Pat. No. 9,267,461.

(30) Foreign Application Priority Data

Jun. 11, 2007  (JP) .................................. 2007-154000
Mar. 31, 2008  (JP) .................................. 2008-089880

(51) Int. Cl.

| | | |
|---|---|---|
| *B23K 26/384* | (2014.01) | |
| *B23K 26/00* | (2014.01) | |
| *B23K 26/14* | (2014.01) | |
| *B23K 26/16* | (2006.01) | |
| *F02F 5/00* | (2006.01) | |
| *F16J 13/12* | (2006.01) | |
| *B23K 103/04* | (2006.01) | |
| *F16F 5/00* | (2006.01) | |

(52) U.S. Cl.
CPC ........... *B23K 26/384* (2015.10); *B23K 26/0072* (2013.01); *B23K 26/0081* (2013.01);

(Continued)

(58) Field of Classification Search
CPC ....... F02F 5/00; B23K 26/0072; B23K 26/14; B23K 2203/04; B23K 2201/10; B23K 26/381; B23K 26/383; B23K 26/384; B23K 26/0081; B23K 26/16; F16J 13/12; F16J 9/20; F16J 9/203; B21D 28/24; B21D 28/28; B21D 28/34

See application file for complete search history.

(56) References Cited

U.S. PATENT DOCUMENTS 3,467,397 A * 9/1969 Sugahara .................. F16J 9/062
                                                                    277/444
5,411,609 A * 5/1995 Karoake ................... B21B 1/166
                                                                    148/325

(Continued)

FOREIGN PATENT DOCUMENTS

JP    3-260473 A    11/1991
JP    9-159025 A    6/1997

(Continued)

OTHER PUBLICATIONS

Chinese Office Action dated Nov. 25, 2013 issued in corresponding Chinese Application No. 201110386485.9.

*Primary Examiner* — David Bryant
*Assistant Examiner* — Lawrence Averick
(74) *Attorney, Agent, or Firm* — Sughrue Mion, PLLC

(57) ABSTRACT

Provided is a wire rod for an I-type oil ring, which includes right and left rail portions and a web portion connecting the rail portions, which has an oil hole or a molten through hole formed in the web portion, and which has a circumscribing circle diameter of 10 mm or less in its transverse contour. The molten through hole has such a remolten portion formed on its exit side as encloses the exit of the molten through hole. The remolten portion exceeds such a molten portion in the transverse section along the center of the molten through hole as is formed in the molten through hole, and is formed to have 200 μm or less from the outer circumference of the molten through hole and 100 μm or less in the depth direction of the molten through hole.

7 Claims, 5 Drawing Sheets

(52) U.S. Cl.
CPC ............... *B23K26/14* (2013.01); *B23K 26/16* (2013.01); *F02F 5/00* (2013.01); *F16J 13/12* (2013.01); *B23K 2201/10* (2013.01); *B23K 2203/04* (2013.01)

(56) References Cited

U.S. PATENT DOCUMENTS

| | | | |
|---|---|---|---|
| 6,670,571 B2 * | 12/2003 | Dance | B23K 15/08 219/121.18 |
| 7,316,067 B2 | 1/2008 | Blakey | |
| 7,887,712 B2 * | 2/2011 | Boyle | B23K 26/12 216/65 |
| 2003/0098295 A1 | 5/2003 | Kawamoto et al. | |
| 2009/0057282 A1 | 3/2009 | Huang et al. | |

FOREIGN PATENT DOCUMENTS

| | | |
|---|---|---|
| JP | 2001-219285 A | 8/2001 |
| JP | 2007-57008 A | 3/2007 |
| WO | 2006/132229 A1 | 12/2006 |

\* cited by examiner 1 mm 1 mm

100 μm

100 μm 1 mm

WIRE FOR I-SHAPE OIL RINGS AND PRODUCING METHOD OF THE SAME

CROSS REFERENCE TO RELATED APPLICATIONS

This application is a divisional of U.S. application Ser. No. 12/663,952 filed Dec. 10, 2009, which is a National Stage of International Application No. PCT/JP2008/060649 filed Jun. 11, 2008, claiming priority based on Japanese Patent Application Nos. JP 2007-154000 filed Jun. 11, 2007 and JP 2008-089880 filed Mar. 31, 2008, the contents of all of which are incorporated herein by reference in their entirety.

TECHNICAL FIELD

The present invention relates to a wire for I-shape oil rings having a left and a right rail sections and a web section connecting the left and right rail sections with each other, and a producing method thereof.

BACKGROUND ART

Conventionally, an I-shape wire used for producing oil rings mounted on pistons of internal combustion engines has been provided with oil holes I-shape by stamping. In order to conduct piercing by stamping, it is necessary to prepare dies corresponding to individual product specifications.

In contrast, as disclosed in Patent Document 1 (see below), laser beam processing has been proposed as means for formation of oil holes in an I-shape oil wire. In order to form oil holes, the technique shown in Patent Document 1 does not need preparing dies corresponding to individual product specifications, and is advantageous in enabling formation of optional hole shapes and hole pitches by means of laser beam processing.

The method of producing steel oil rings shown in Patent Document 1 is advantageous in reduction of man-hour for piercing but involves a problem that solidified residues (herein below referred to as dross) generated by laser beam processing adhere to a surface of profile wires. When the dross remains, there is a risk that during operation of engines, the dross exfoliated from the oil rings is mixed in engine lubricant oil as a metal lump thereby damaging a cylinder wall.

In order to improve the influence of dross adhesion, Patent Document 2 discloses to use a high thermal energy density processing method (including the YAG laser method) together with an assist gas of oxygen or air, as heating means. Also, the document teaches to reheat the dross and blow out it at a backside of the wire. Patent Document 2 further teaches an effectiveness of a method of removing dross in inline by means of scrubbing (i.e. grinding, cutting or chipping) as measures against the dross problem.

Patent Document 1: JP-A-3-260473
Patent Document 2: JP-A-9-159025

DISCLOSURE OF THE INVENTION

Problems to be Solved by the Invention

While Patent Document 2 discloses the technique of melting the dross adhered on the surface of the wire to blow out the same with high pressure gas, even if slag is removed from around a hole, there is a risk that the slag adheres again in another location on the surface, or passes through the hole to adhere to a back surface of the wire, so that the technique lacks reliability.

Also, when thermal energy and gas pressure being sufficient to blow out the dross formed on a through hole are exerted, there is a risk that a shape of the through hole is not conformity with a predetermined shape thereby making the wire to lose a performance as an oil ring.

Accordingly it is an object of the present invention to reduce the influence of the dross in a wire for I-shape oil rings and a manufacturing method thereof, and to provide the wire for an I-shape oil ring, which wire has oil holes with a predetermined shape and dimensions, and the manufacturing method thereof.

Means for Solving the Problems

The present inventors found out that it is possible to reduce the influence of dross and obtain oil holes each having a predetermined shape by forming a predetermined remelting portion at an outlet side of each of the oil holes, which are through holes, formed by melting, of a wire for I-shape oil rings.

According to a first aspect of the invention, there is provided:

a wire for I-shape oil rings, comprising a left and a right rail sections, and a web section connecting the rail sections with each other and having oil holes as through holes formed by melting, the wire having a diameter of not more than 10 mm which is defined by a circle circumscribing a contour of a cross section of the wire, wherein there is formed a remelted and solidified portion surrounding an outlet of each of the through holes, wherein the remelted and solidified portion is formed so as to exceed a melted and solidified region around the through hole but not to exceed 200 μm from the periphery of the through hole, when viewing a cross section of the wire taken along the axis of the through hole, and wherein the remelted and solidified portion is formed so as not to exceed 100 μm in a depth direction from the outlet of the through hole.

Preferably, the through holes are formed in a direction from a smaller opening angle side toward a larger opening angle side of the wire when viewing a cross section of the wire.

Preferably, a height of projections of the through hole on upper and lower surfaces of the wire is not more than 30 μm.

According to a second aspect of the invention, the wire for I-shape oil rings can be produced by the method comprising the steps of:

piercing the through holes by means of laser; and forming a remelted and solidified portion surrounding an outlet of each of the through holes by means of laser, wherein the remelted and solidified portion is formed so as to exceed a melted and solidified region around the through hole but not to exceed 200 μm from the periphery of the through hole, when viewing a cross section of the wire taken along the axis of the through hole, and wherein the remelted and solidified portion is formed so as not to exceed 100 μm in a depth direction from the outlet of the through hole.

Preferably, the through holes are formed in a direction from a smaller opening angle side toward a larger opening angle side of the wire when viewing a cross section of the wire.

Preferably, a height of projections of the through hole on upper and lower surfaces of the wire is not more than 30 μm.

Preferably, oil is applied to at least a surface section of the wire for I-shape oil rings, in which surface section a through hole is formed, prior to the piercing process.

Preferably, the piercing process comprises a preliminary piercing step of piercing a through hole having a smaller size than a predetermined size, and a finishing step of piercing a through hole having the predetermined size.

A surface of the web section formed with the remelted and solidified portion may be subjected to shot-blasting after forming the remelted and solidified portion.

Effect of the Invention

According to the invention, it is possible to reduce the influence of dross and to obtain an oil hole having a predetermined shape by forming the remelted and solidified portion on an outlet side of the oil hole, which is the through hole of the wire for I-shape oil rings.

BEST MODE FOR CARRYING OUT THE INVENTION

With a wire for I-shape oil rings, according to the invention, there is formed a remelted and solidified portion surrounding an outlet of each of the through holes. The remelted and solidified portion is formed so as to exceed a melted and solidified region around the through hole but not to exceed 200 μm from the periphery of the through hole, when viewing a cross section of the wire taken along the axis of the through hole. Further, the remelted and solidified portion is formed so as not to exceed 100 μm in a depth direction from the outlet of the through hole.

Figure 1:
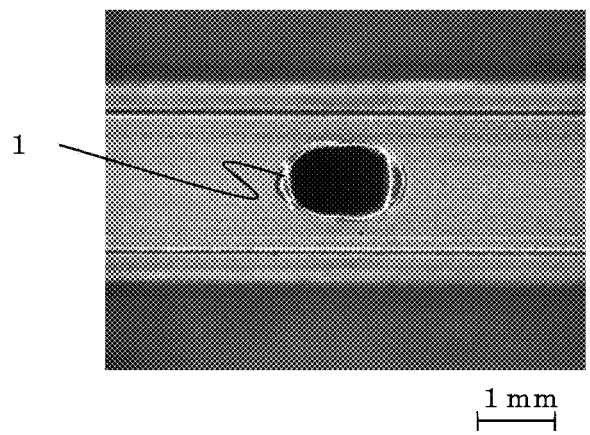
FIG. 1 is a microphotograph showing an example of a surface state of a wire for I-shape oil rings, according to the invention.
Figure 2:
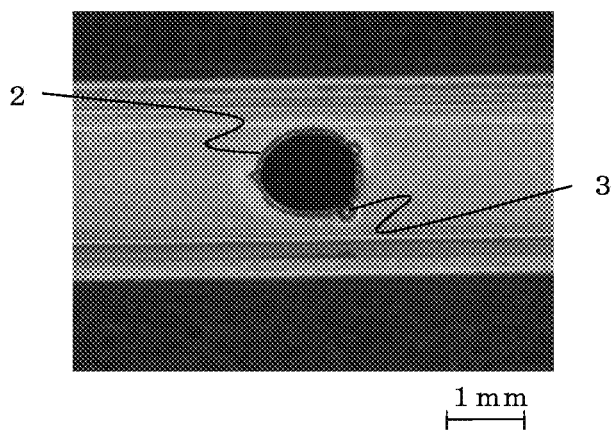
FIG. 2 is a microphotograph showing an example of a surface state after a through hole is formed by melting.

Dross occurred in the through hole of the wire for I-shape oil rings is mainly produced around the outlet of the through hole 2, that is, a region which surrounds the outlet in a piercing direction as shown in FIG. 2. According to the invention, since the remelted and solidified portion 1 is formed around the outlet of the through hole 2 as shown in FIG. 1, the dross 3 occurred, as shown in FIG. 2, around the outlet of the through hole 2 is remelted to be integrated with the wire thereby restraining the dross from exfoliation resulting in a harmless dross.

The remelted and solidified portion formed on the wire for I-shape oil rings, according to the invention, is required to exceed a melted and solidified region around the through hole when viewing a cross section of the wire taken along an axis of the through hole. Dross is frequently formed along a melted and solidified portion formed on the through hole and when the remelting portion does not exceed the melted and solidified portion, it is insufficient to inhibit dross from exfoliation and to have dross made integral with a wire. Also, since there is a risk that when the remelting portion excessively extends, toughness is adversely affected, it is preferred that the remelted and solidified portion be formed to have 200 μm or less from the outer circumference of the through hole. Also, since there is a risk that when the remelted and solidified portion is too deep in the depth direction, toughness is adversely affected, it is preferred that the remelted and solidified portion be formed to have 100 μm or less in the depth direction of the through hole. In addition, the remelted and solidified portion of a through hole and a thermally affecting layer formed with formation of the melting portion are preferably as thin as possible since toughness is adversely affected thereby.

In the invention, influences of formation of a remelted and solidified portion on strength and toughness of a wire is prescribed in terms of cross section since they are large in a width direction (direction of wire diameter). When the remelting portion excessively extends in a length direction of a wire, however, there is a risk that strength and toughness are adversely affected. Accordingly, the remelting portion preferably has 500 μm or less from the outer circumference of the through hole also in the length direction of a wire.

In addition, the through hole is liable to be shaped large on an incidence side of laser and small on an outgoing side. Therefore, a remelted and solidified portion is actually formed on a side, on which a through hole is small in diameter.

The through holes in the wire for I-shape oil rings, according to the invention, is preferably formed in a direction from a smaller opening angle side toward a larger opening angle side of the wire when viewing a cross section of the wire.

When the through holes are formed in the wire for I-shape oil rings, molten metal is occasionally blown off by assist gas. At this time, there is a possibility that flying molten metal (i.e. sputtering) adheres again to the wire. By setting a piercing direction from a smaller opening angle side toward a larger opening angle side of the wire, it is possible to make the wire distant from a scattered region of sputter, thus enabling reducing a risk that sputter adheres to the wire. In a piercing process, it is preferable to apply assist gas at high pressure of 0.2 MPa or higher in order to blow off a molten metal.

Also, in a remelted and solidified portion forming process, sufficient pressure to blow off dross, used in the piercing process, is not needed but the use of assist gas at 0.05 MPa or lower is preferable with a view to having dross remelted and solidified and staying there.

It is preferred that projections on upper and lower surfaces of the through hole be 30 μm or less in height. This is because of a risk that being over 30 μm, the projections obstruct oil flow when a wire is used as an oil ring and of a possibility that the inherent performance of an oil ring is impeded. By making a projection, which is provided on a remelted and solidified portion formed around the through hole, 30 μm or less in height, it is possible to ensure flowability of oil required as a function of an oil ring.

In addition, the height of a projection enables adjusting the injection pressure of assist gas, a nozzle position, laser power, defocusing, or the like and exercising control to 30 μm or less while keeping the through hole in shape.

A method of manufacturing an I-shape oil ring material, according to the invention, comprises a piercing process of piercing the through hole by means of laser and a remelted and solidified portion forming process of forming a remelted and solidified portion, which encloses an exit of the through hole, on an outlet side of the through hole.

While the piercing process and the remelted and solidified portion forming process may be conducted in separate process lines, they are preferably arranged successively in the same process line since it is possible to accurately form a remelted and solidified portion around the through hole formed in the piercing process and to reduce the possibility that dross is left.

A method of manufacturing a wire for I-shape oil rings, according to the invention, preferably comprises an oil applying process, in which oil is applied to at least a surface of the wire for I-shape oil rings, on which a through hole is formed, prior to the piercing process. By applying oil to at least a surface of the wire for I-shape oil rings, on which a through hole is formed, it is possible to reduce adhesion of sputter generated in the piercing process. Also, by applying oil also to an outlet side of the through hole, it is possible to use assist gas to reduce adhesion of sputter scattered over an exit surface of the through hole.

This is because oil applied to the wire prevents sputter from coming into direct contact with a wire surface.

The piercing process in the invention preferably comprises a preliminary piercing process of piercing holes each having a smaller dimension than a predetermined dimension, and a finish piercing process of piercing holes each having a predetermined dimension. By piercing through holes by melting in two or more stages, it is possible to reduce dross generated in the finish piercing process and a scattering quantity of sputter.

It is required that holes subjected to piercing in the preliminary piercing process be shaped to make adhesion of dross and sputter hard and kept in shape, the holes being preferably smaller in length and width than holes formed in the finish piercing process. Also, both centers of holes being subjected to piercing in the preliminary piercing process and holes being subjected to piercing in the finish piercing process are preferably present at a width center of the wire.

Penetration is not necessarily required in the preliminary piercing process.

In the method of manufacturing a wire for I-shape oil rings, according to the invention, that surface of a web section, on which a remelted and solidified portion is formed, can be subjected to blasting subsequently to the remelted and solidified portion forming process. By subjecting a surface, on which a remelted and solidified portion is formed, to blasting, without deformation of the wire, sputter, oil content, etc. adhered on the wire are removed, and it is possible to obtain a predetermined surface roughness. Also, by providing a predetermined surface roughness on a surface of a wire for I-shape oil rings, according to the invention, it is possible to expect an improvement in a force, by which an oil film needed as a function of an oil ring is held.

Also, media, processing pressure, etc. in blasting in the invention can be appropriately selected according to specifications of a product depending upon a configuration of adhesion of an object, which adheres to a wire and should be removed.

Example 1

Figure 4:
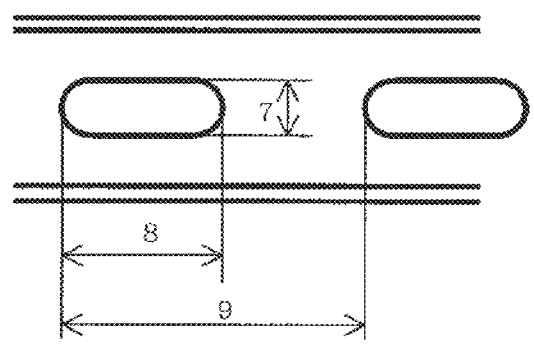
FIG. 4 is a schematic view showing an example of a surface state of a wire for I-shape oil rings, according to the invention.

According to the embodiments described above, while a wire for I-shape oil rings, shown in Specimen 1 in TABLE 1, was caused to run continuously, a slot-like oil hole, in which a width 7, a length 8, and a pitch 9 shown in FIG. 4 are indicated in TABLE 1, was formed on a web section of the wire by laser processing, and then a remelted and solidified portion for making dross harmless was formed by laser processing. Details will be described below.

First, in a laser processing equipment used in the invention, an oil applying process, a preliminary piercing process, a finish piercing process, a remelted and solidified portion forming process, and a wet blasting machine were arranged straight along a running line of a wire. For a wire for I-shape oil rings, used in the experiment, a wire, in which a width 4, a thickness 5, and a web thickness 6 shown in FIG. 3 are indicated in TABLE 1, was prepared, and first, while the wire was caused to run in a posture, in which a R surface was directed upward as shown in FIG. 3, oil was applied to a surface, on which a through hole of the wire was to be formed.

Figure 3:
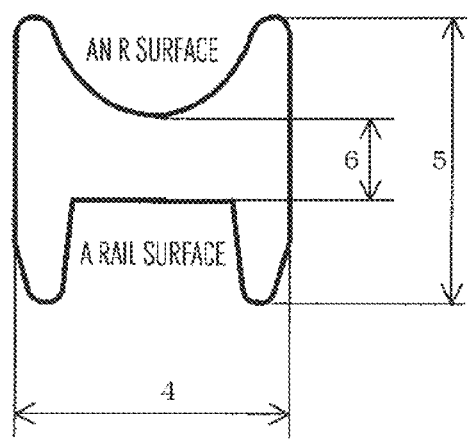
FIG. 3 is a schematic view showing an example of the shape of a cross section of a wire for I-shape oil rings, according to the invention.

In the preliminary piercing process, pulse YAG laser having a power of 2.0 kW and a smaller spot diameter than that used for piercing of a predetermined dimension was irradiated toward a web from above the R surface shown in FIG. 3 for a shorter period of time than that required for piercing of a predetermined dimension in a manner to be focused approximately into a web medium point, and nitrogen gases having a pressure of 0.7 MPa were jetted to form a smaller through hole than a hole of a predetermined dimension.

Figure 7:
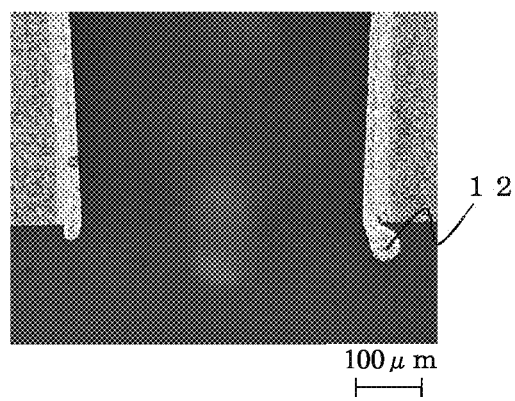
FIG. 7 is a microphotograph showing a cross section of a wire, according to the invention, after forming a through hole by melting.

In the finish piercing process, pulse YAG laser having a power shown in TABLE 1 and a spot diameter of 0.45 mm was irradiated, as shown in FIG. 3, from the upper side, with a round surface having a broader opening angle when viewing a cross section of the wire, toward the web section, for 2 ms so as to be focused approximately on a midpoint of the web section, and simultaneously nitrogen gases having a pressure of 0.7 MPa were jetted to form through holes. At this time, it was confirmed that when only the through hole was formed as shown in FIG. 7, dross 12, partially projecting from a base material and involving the risk of exfoliation, adhered on an outlet side of the through hole. Also, it was confirmed that no sputter adhered to the wire.

Figure 9:
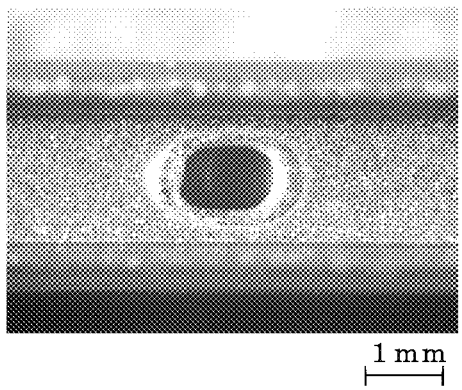
FIG. 9 is a microphotograph showing an appearance of a wire with one surface side, on which a remelted and solidified portion is formed, and which was subjected to shot-blasting.

Subsequently, pulse YAG laser having a power shown in TABLE 1 was irradiated to a region covering that portion at an exit of the through hole, on which dross was generated, for 3.0 ms, and nitrogen gases having a pressure of 0.03 MPa were jetted as assist gas to remelt and solidify the dross again. The results are shown in FIG. 9 and TABLE 2. In addition, a melted and solidified portion depth shown in TABLE 2 was measured as viewed from a side of the through hole in a direction along a width 4 of a molten portion.

Figure 8:
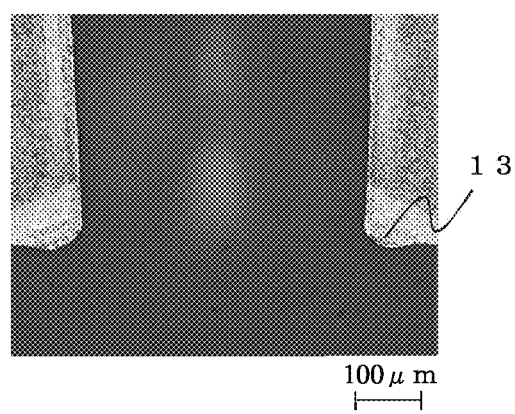
FIG. 8 is a photograph showing the microstructure of a cross section of a wire, according to the invention, after forming a remelted and solidified portion.

As shown in FIG. 8 and TABLE 2, a remelted and solidified portion 13 was formed exceeding a molten portion formed on the through hole in the direction along the width 4 when viewed in a cross section about a center of the through hole. In Specimen 1, it was confirmed that the remelted and solidified portion was formed to have 100 μm or less from an outer periphery of an exit of the through hole in the direction along the width 4 and 30 μm or less from in a depth direction of the through hole, that is, a direction along a depth 5. Thereby, it was possible to obtain a wire, in which dross 12 shown in FIG. 7 and having the possibility of exfoliation as shown in FIG. 7 was remelted and integrated with a base metal and the risk of dross falling off into an engine was eliminated.

At this time, it was confirmed that a height of a projection in the direction along the depth 5 was 15 μm at maximum on the outlet side of the through hole, that is, on the remelted and solidified portion and 0 μm on an incidence side of the through hole, and a periphery of the through hole was made smooth. Thereby, it can be expected to ensure oil flowability required as a function of an oil ring.

Subsequently, under the conditions of Specimens 2 to 4 in TABLE 1, a wire for I-shape oil rings was caused to run reversely to that in FIG. 3, that is, in a posture, in which a rail surface was directed upward, to fabricate a wire for I-shape oil rings going through an oil applying process, a preliminary piercing process, a finish piercing process, and a remelted and solidified portion forming process in the same manner as in Specimen 1. In addition, 10 Cr steel in Specimen 4 shown in TABLE 1 and TABLE 2 is one containing, by mass %, 0.5% of C, 0.2% of Si, 0.3% of Mn, 10% of Cr, the balance being Fe, and unavoidable impurities.

In the preliminary piercing process, a wire was caused to run in a posture, in which a R surface was directed upward as shown in FIG. 3, and laser was irradiated toward a web from under a rail surface under the conditions shown in TABLE 1 to form through holes by melting.

Subsequently, in the finish piercing process, a wire for I-shape oil rings was caused to run in a posture, in which a R surface was directed upward as shown in FIG. 3, and laser was irradiated toward a web from a lower side having a smaller opening angle when viewing a cross section of the wire, under the conditions shown in TABLE 1 to form through holes. As a specific example, the results of Specimen 2 are shown in FIG. 5.

Figure 5:
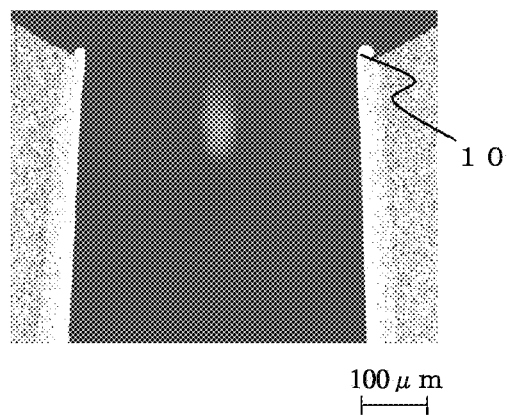
FIG. 5 is a photograph showing the microstructure of a cross section of a wire, according to the invention, after a through hole is formed by melting.

It was confirmed that when only a through hole was formed as shown in FIG. 5, dross 10, involving the risk of exfoliation, adhered on an outlet side of the through hole. Also, at this time, it was confirmed that sputter did not adhere to the wire.

Figure 6:
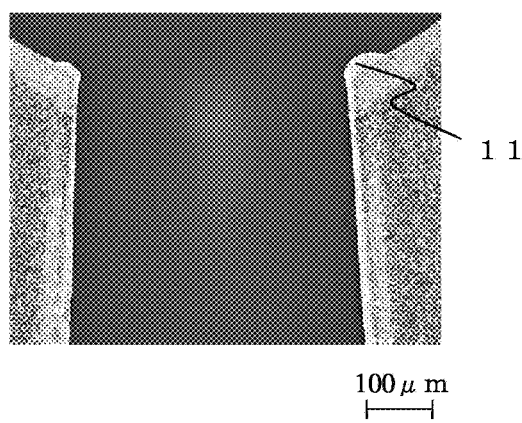
FIG. 6 is a photograph showing the microstructure of a cross section of a wire, according to the invention, after a remelted and solidified portion is formed.

Subsequently, a wire was caused to run in a posture, in which a R surface shown in FIG. 3 was directed upward, and a remelted and solidified portion was formed at an exit of the through hole under the same conditions as those in Specimen 1. The results for Specimen 2 are shown in FIG. 6 and TABLE 2, and the results for the rest are shown in a lump in TABLE 2. In addition, the respective measurements were made in the same manner as in Specimen 1.

As shown in FIG. 6 and TABLE 2, it could be confirmed also in Specimens 2 to 4 that there was obtained a wire, in which dross 10 was remelted and integrated with a base material to form a remelted and solidified portion 11 and so the risk of dross falling off into an engine was eliminated in the same manner as in Specimen 1.

Example 2

Succeeding the remelted and solidified portion forming process in Specimen 2 shown in TABLE 1, a wet blasting machine mounted in an inline manner was used to subject that surface side of the web, on which a remelted and solidified portion was formed, to blasting of slurry having a concentration of 20% with a delivery gun under the conditions of a wire inbetween distance of 20 mm and air pressure of 0.5 MPa. The results are shown in FIG. 9.

As shown in FIG. 9, it was confirmed that oil content was removed without marring the shape of a product. At this time, the surface roughness of a wire was Rz1.5 μm. Thereby, it is possible to expect an improvement in a force, by which an oil film needed as a function of an oil ring is held.

TABLE 1

| | MATERIAL | CROSS SECTIONAL DIMENSION OF WIRE WIDHT × THICKNESS × WEB THICKNESS (mm) | DIMENSION OF HOLE (INCIDENCE SIDE) | | INCIDENCE SURFACE IN PIERCING PROCESS |
|---|---|---|---|---|---|
| | | | PITCH (mm) | LENGTH (mm) | WIDTH (mm) | |
| SPECIMEN 1 | CORRESPONDING TO SUS420J2 | 1.5 × 2.0 × 0.5 | 5 | 0.90 | 0.55 | R SURFACE |
| SPECIMEN 2 | CORRESPONDING TO SUS420J2 | 1.5 × 2.0 × 0.5 | 5 | 0.90 | 0.55 | RAIL SURFACE |
| SPECIMEN 3 | CORRESPONDING TO SUS420J2 | 1.5 × 1.7 × 0.4 | 7 | 1.30 | 0.50 | RAIL SURFACE |
| SPECIMEN 4 | 10Cr STEEL | 2.0 × 2.0 × 0.45 | 5 | 1.20 | 0.55 | RAIL SURFACE |

| | LASER POWER IN PIERCING PROCESS (kW) | LASER POWER IN REMELTED AND SOLIDIFIED PORTION FORMING PROCESS (kW) | ASSIST GAS PRESSURE IN PIERCING PROCESS (MPa) | ASSIST GAS PRESSURE IN REMELTED AND SOLIDIFIED PORTION FORMING PROCESS (MPa) |
|---|---|---|---|---|
| SPECIMEN 1 | 5.5 | 0.7 | 0.7 | 0.035 |
| SPECIMEN 2 | 5.5 | 0.7 | 0.7 | 0.030 |
| SPECIMEN 3 | 3.5 | 0.8 | 0.7 | 0.025 |
| SPECIMEN 4 | 5.0 | 0.7 | 0.7 | 0.030 |

*NOTES: WIRES USED IN SPECIMENS 1 TO 3 CORRESPOND TO JIS SUS420J2

TABLE 2

| | | DEPTH OF MELTED AND SOLIDIFIED PORTION (μm) | | WIDTH OF REMELTED AND SOLIDIFIED PORTION (μm) | | DEPTH OF REMELTED AND SOLIDIFIED PORTION (μm) | | HEIGHT OF BURR (μm) | SURFACE ROUGHNESS OF WEB (μm) |
|---|---|---|---|---|---|---|---|---|---|
| | MATERIAL | MAXIMUM | AVERAGE | MAXIMUM | AVERAGE | MAXIMUM | AVERAGE | MAXIMUM | Rz |
| SPECIMEN 1 | CORRESPONDING TO SUS420J2 | 22.8 | 22.5 | 75 | 57 | 29.2 | 19.1 | 15 | 0.4 |
| SPECIMEN 2 | CORRESPONDING TO SUS420J2 | 24.4 | 22.7 | 120 | 110 | 48.0 | 47.4 | 30 | 1.5 |
| SPECIMEN 3 | CORRESPONDING TO SUS420J2 | 15.4 | 15.3 | 80 | 75 | 48.8 | 37.7 | 14 | 0.4 |
| SPECIMEN 4 | 10Cr STEEL | 12.6 | 11.3 | 130 | 120 | 24.5 | 23.1 | 20 | 0.4 |

* NOTES: WIRES USED IN SPECIMENS 1 TO 3 CORRESPOND TO JIS SUS420J2.

DESCRIPTION OF REFERENCE NUMERALS

1, 11 and 13: remelted and solidified portions
2: a through hole formed by melting
3, 10 and 12: dross
4: a width
5: a thickness
6: a thickness of a web
7: a width
8: a length
9: a pitch of the through holes

What is claimed is:

1. A method of producing a wire for I-shape oil rings, which wire comprises a left and a right rail sections, and a web section connecting the rail sections with each other, has oil holes as through holes formed by melting, and has a diameter of not more than 10 mm which is defined by a circle circumscribing a contour of a cross section of the wire,
wherein the method comprises the steps of:
piercing the through holes by means of laser; and
forming a remelted and solidified portion surrounding an outlet of each of the through holes by means of laser,
wherein the remelted and solidified portion is formed so as to exceed a melted and solidified region around the through hole but not to exceed 200 μm from the periphery of the through hole, when viewing a cross section of the wire taken along the axis of the through hole, and
wherein the remelted and solidified portion is formed so as not to exceed 100 μm in a depth direction from the outlet of the through hole.

2. The method of manufacturing a wire for I-shape oil rings, according to claim 1, wherein the through holes are formed in a direction from a smaller opening angle side toward a larger opening angle side of the wire when viewing a cross section of the wire.

3. The method of manufacturing a wire for I-shape oil rings, according to claim 1, wherein a height of projections of the through hole on upper and lower surfaces of the wire is not more than 30 μm.

4. The method of manufacturing a wire for I-shape oil rings, according to claim 2, wherein a height of projections of the through hole on upper and lower surfaces of the wire is not more than 30 μm.

5. The method of manufacturing a wire for I-shape oil rings, according to claim 1, further comprising the step of applying oil to at least a surface section of the wire for I-shape oil rings, in which surface section a through hole is formed, prior to the piercing process.

6. The method of manufacturing a wire for I-shape oil rings, according to claim 1, wherein the step of the piercing comprises a preliminary piercing step of piercing a through hole having a smaller size than a predetermined size, and a finishing step of piercing a through hole having the predetermined size.

7. The method of manufacturing a wire for I-shape oil rings, according to claim 1, wherein after forming the remelted and solidified portion, a surface of the web section formed with the remelted and solidified portion is subjected to shot-blasting treatment.

* * * * *